(12) United States Patent
Yates et al.

(10) Patent No.: US 11,489,601 B2
(45) Date of Patent: Nov. 1, 2022

(54) METHODS AND SYSTEMS FOR AUTO-ADJUSTMENT OF SIGNAL QUALITY

(71) Applicant: Cox Communications, Inc., Atlanta, GA (US)

(72) Inventors: Shane Yates, Atlanta, GA (US); Joseph Keller, Atlanta, GA (US); Christian Welin, Atlanta, GA (US); Amrit Shaswat, Atlanta, GA (US); Brian Stublen, Atlanta, GA (US); Brad Pfaff, Atlanta, GA (US); Drew Milley, Atlanta, GA (US); Alexis Hwang, Atlanta, GA (US); David Norman, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 39 days.

(21) Appl. No.: 17/009,522

(22) Filed: Sep. 1, 2020

(65) Prior Publication Data
US 2022/0069925 A1 Mar. 3, 2022

(51) Int. Cl.
*H04W 88/08* (2009.01)
*H04B 17/318* (2015.01)
(Continued)

(52) U.S. Cl.
CPC ........... *H04B 17/318* (2015.01); *G06F 1/266* (2013.01); *G06F 1/28* (2013.01); *H04L 12/2801* (2013.01);
(Continued)

(58) Field of Classification Search
CPC ......... H04N 21/41407; H04N 5/23238; H04N 21/21805; H04N 21/435; H04N 21/44218;
(Continued)

(56) References Cited

U.S. PATENT DOCUMENTS

| | | | | |
|---|---|---|---|---|
| 2005/0243777 A1* | 11/2005 | Fong | ..................... | H04W 60/00 370/338 |
| 2009/0286489 A1* | 11/2009 | Racherla | ............... | H04L 1/0002 455/74.1 |

(Continued)

*Primary Examiner* — Eva Y Puente
(74) *Attorney, Agent, or Firm* — Eversheds Sutherland (US) LLP

(57) ABSTRACT

Embodiments of the present disclosure provide methods, systems, apparatuses, and computer program products for auto-adjustment signal quality. A method may include determining one or more cable modem devices configured to communicate with a device via a network. The method may include sending poll requests to the one or more cable modem devices to determine a signal power level associated with each of the one or more cable modem devices. The method may include receiving a first poll response from a first cable modem device. The method may include determining, based on the first poll response, a first signal strength associated with the first cable modem device. The method may include determining that the first signal strength deviates from a signal strength threshold. The method may include determining, based on the determination that the first signal strength deviates from the signal strength threshold, a first adjustment to an output power of the device for the first cable modem device.

20 Claims, 7 Drawing Sheets

(51) Int. Cl.
*H04L 12/28* (2006.01)
*G06F 1/28* (2006.01)
*G06F 1/26* (2006.01)
*H04L 43/10* (2022.01)
*H04B 7/185* (2006.01)
*H04L 1/00* (2006.01)
*H04W 52/24* (2009.01)

(52) U.S. Cl.
CPC .......... *H04L 43/10* (2013.01); *H04B 7/18506* (2013.01); *H04L 1/0002* (2013.01); *H04W 52/244* (2013.01)

(58) Field of Classification Search
CPC .. H04N 21/4532; H04N 21/816; H04N 21/84; H04N 21/8456; H04N 5/272; H04N 19/597; H04N 21/2187; H04N 21/23418; H04N 21/2393; H04N 21/2402; H04N 21/2407; H04N 21/251; H04N 21/25841; H04M 3/5133; H04M 3/5175; H04M 2201/40; H04M 2201/41; H04M 2203/2038; H04M 2203/357; H04M 3/2281; H04M 1/02; H04M 1/2473; H04M 1/2478; H04M 1/2535; H04M 1/72409; H05B 47/19; H05B 45/3725; H05B 47/16; H05B 45/20; H05B 45/375; H05B 47/105; H05B 45/00; H05B 45/10; H05B 47/125; H05B 47/195; H05B 45/325; H05B 45/38; H05B 45/395
USPC .......................... 455/434; 370/338; 375/222
See application file for complete search history.

(56) References Cited

U.S. PATENT DOCUMENTS

2016/0057638 A1\* 2/2016 Zinevich ............ H04N 21/4382
455/424
2020/0157373 A1\* 5/2020 Fukada .................... C09D 5/00

\* cited by examiner

METHODS AND SYSTEMS FOR AUTO-ADJUSTMENT OF SIGNAL QUALITY

BACKGROUND

A wide variety of service providers, such as cable providers and satellite providers, may establish communication networks to connect user devices to one or more networks such as the Internet. Traditionally deploying and maintaining such communication networks may require reliable communication between components of a network, which may be costly to deploy and maintain. In some instances, the signal quality between a headend and cable modems in households may fluctuate due to changes in temperatures and/or humidity based on the environment within these households. This results in unreliable communications between various components of the network resulting in reduced user experience. Accordingly, there is a strong need in the market for systems and methods that remedy the aforementioned problems and challenges.

BRIEF DESCRIPTION OF THE DRAWINGS

Figure 1:
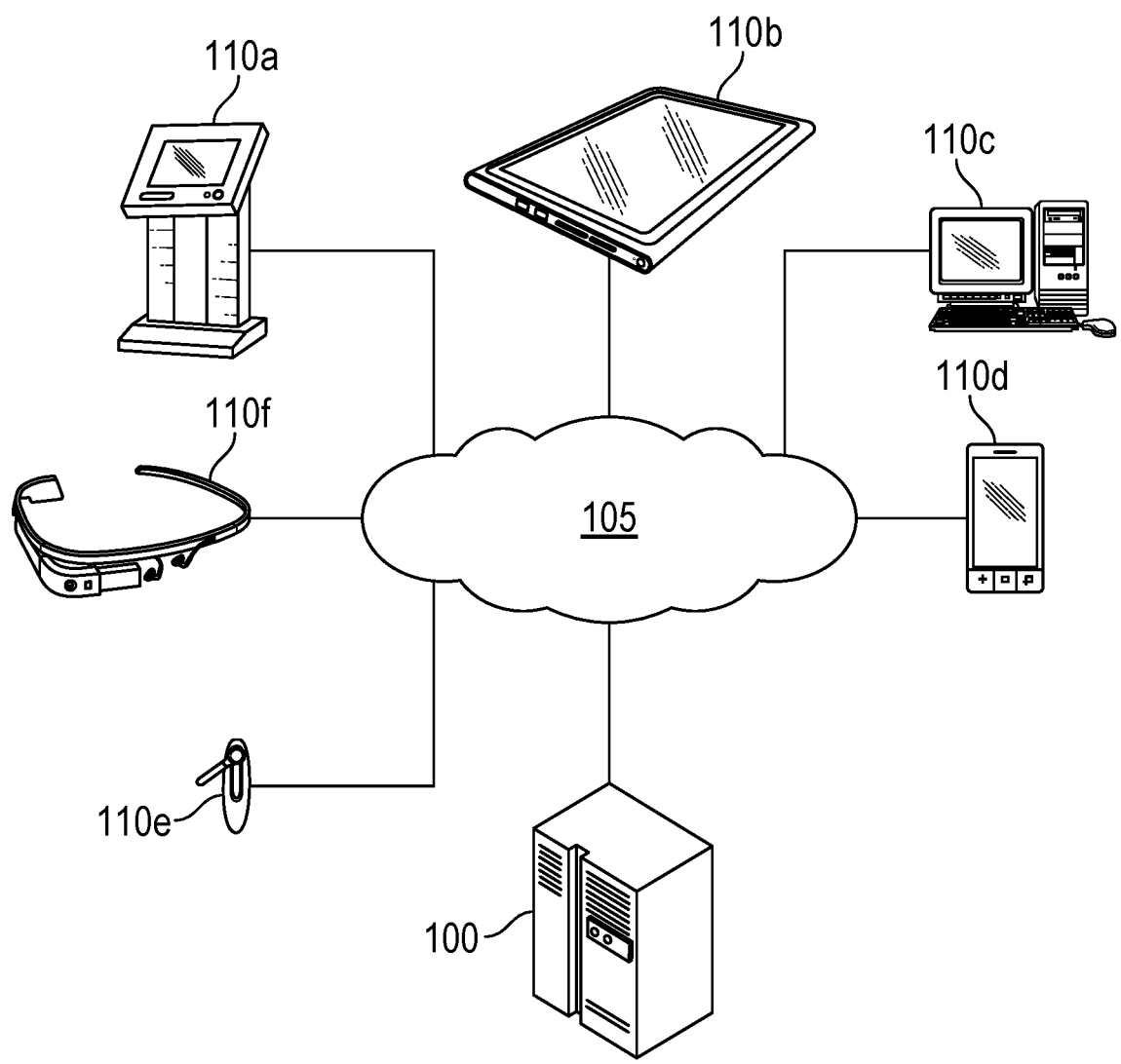

Having thus described the disclosure in general terms, reference will now be made to the accompanying drawings, which are not necessarily drawn to scale, and wherein:

FIG. 1 is an overview of a system that can be used to practice embodiments of the present disclosure.

Figure 2:
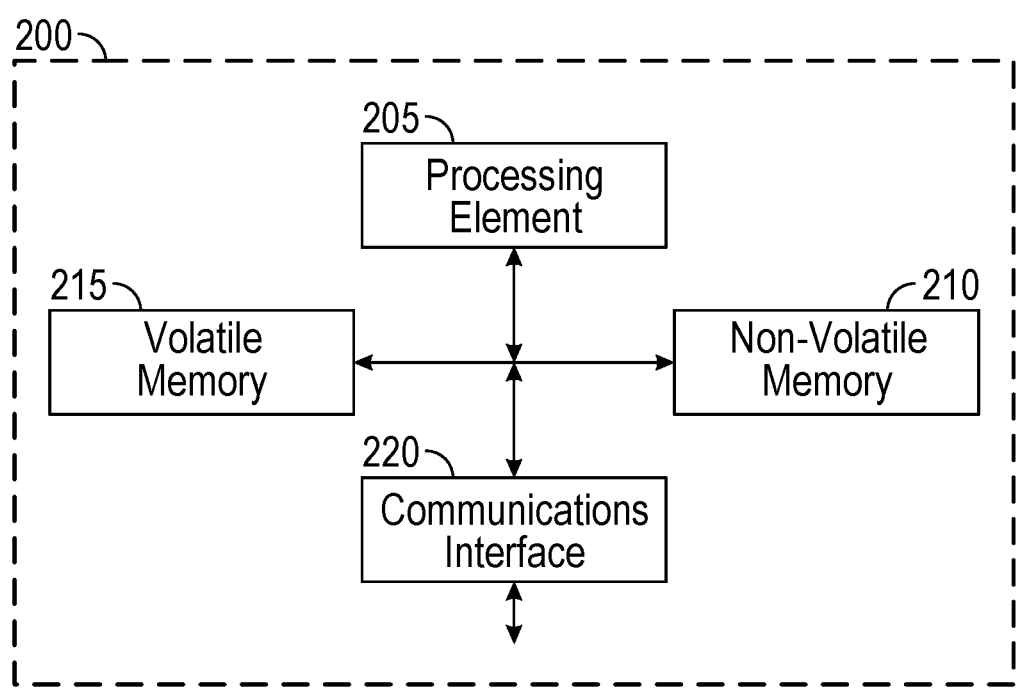

FIG. 2 is an example schematic diagram of a network computing entity according to one embodiment of the present disclosure.

Figure 3:
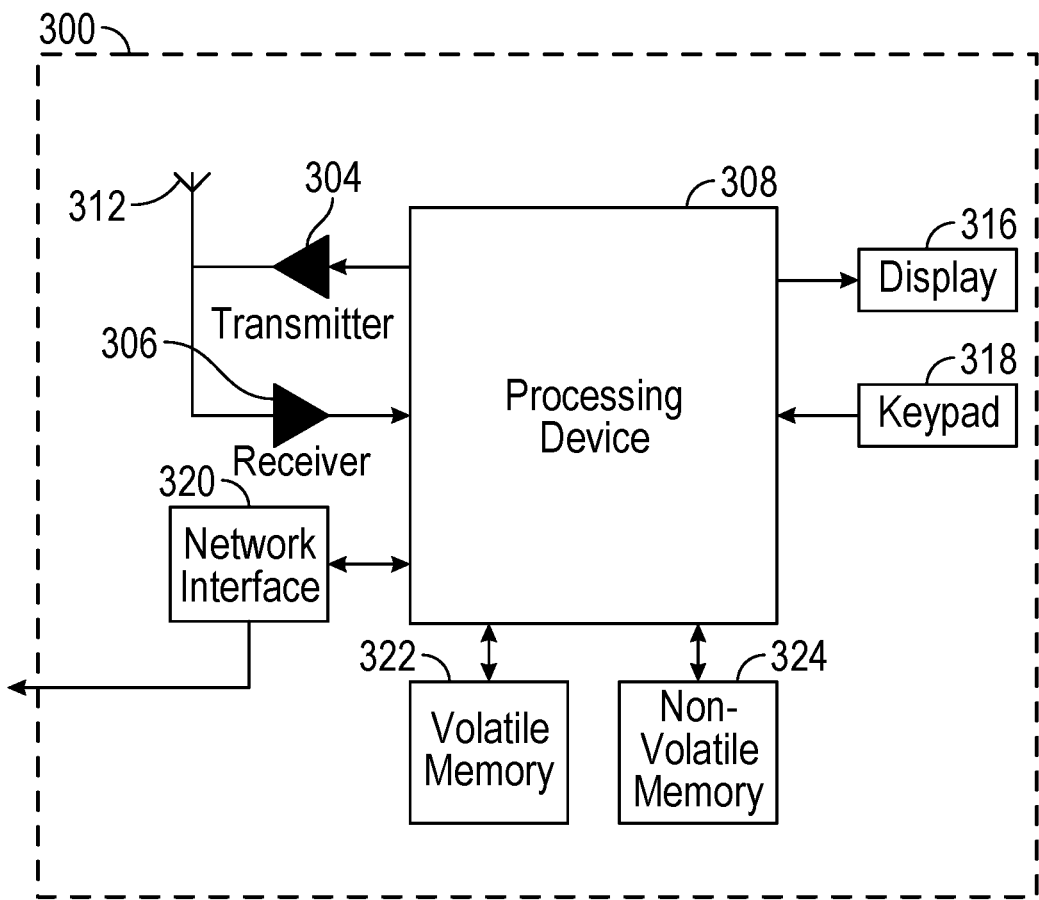

FIG. 3 is an example schematic diagram of a user device according to one embodiment of the present disclosure.

Figure 4:
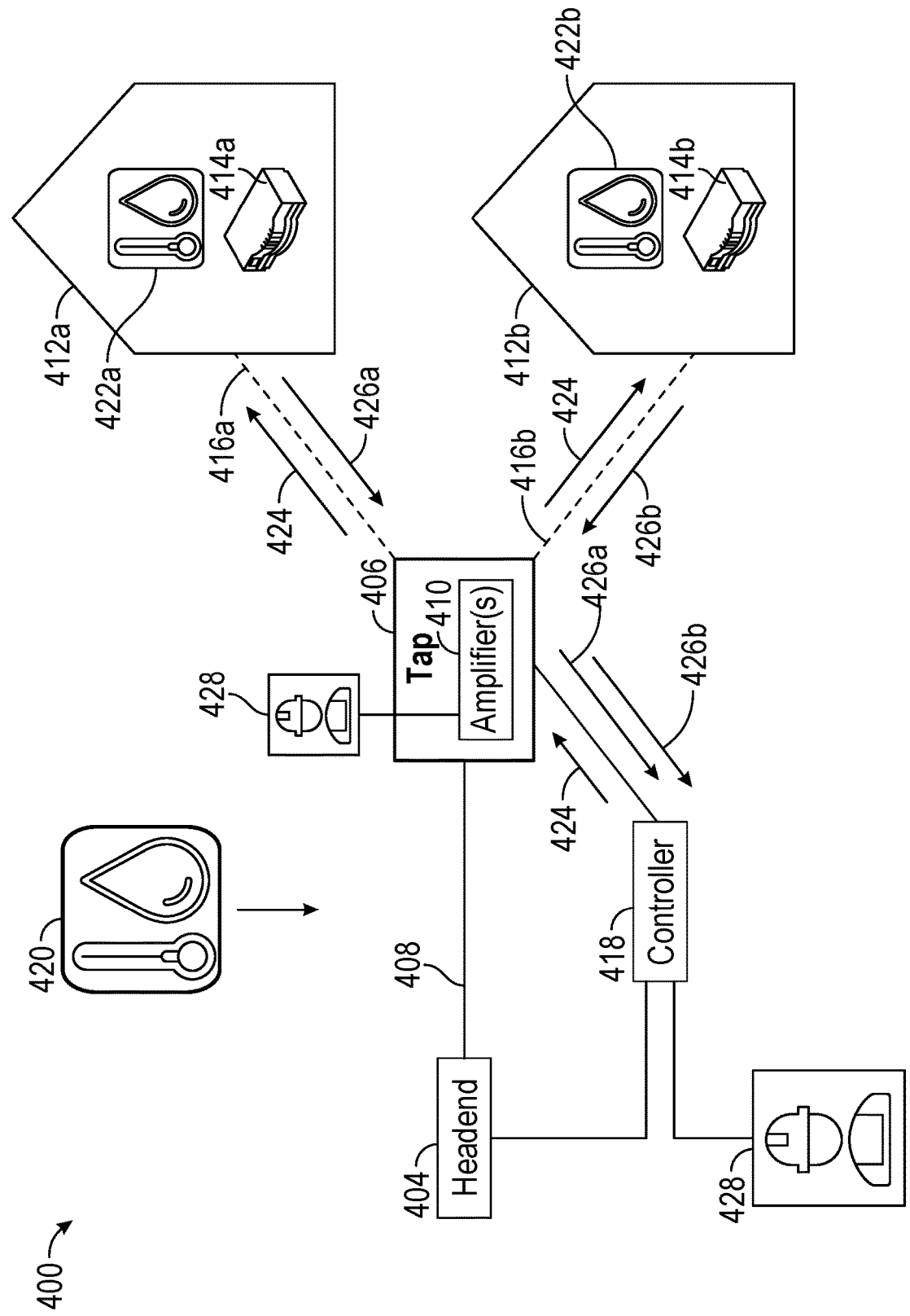

FIG. 4 shows an example diagram of a portion of a cable network and associated devices in a particular network deployment, in accordance with example embodiments of the disclosure.

Figure 5:
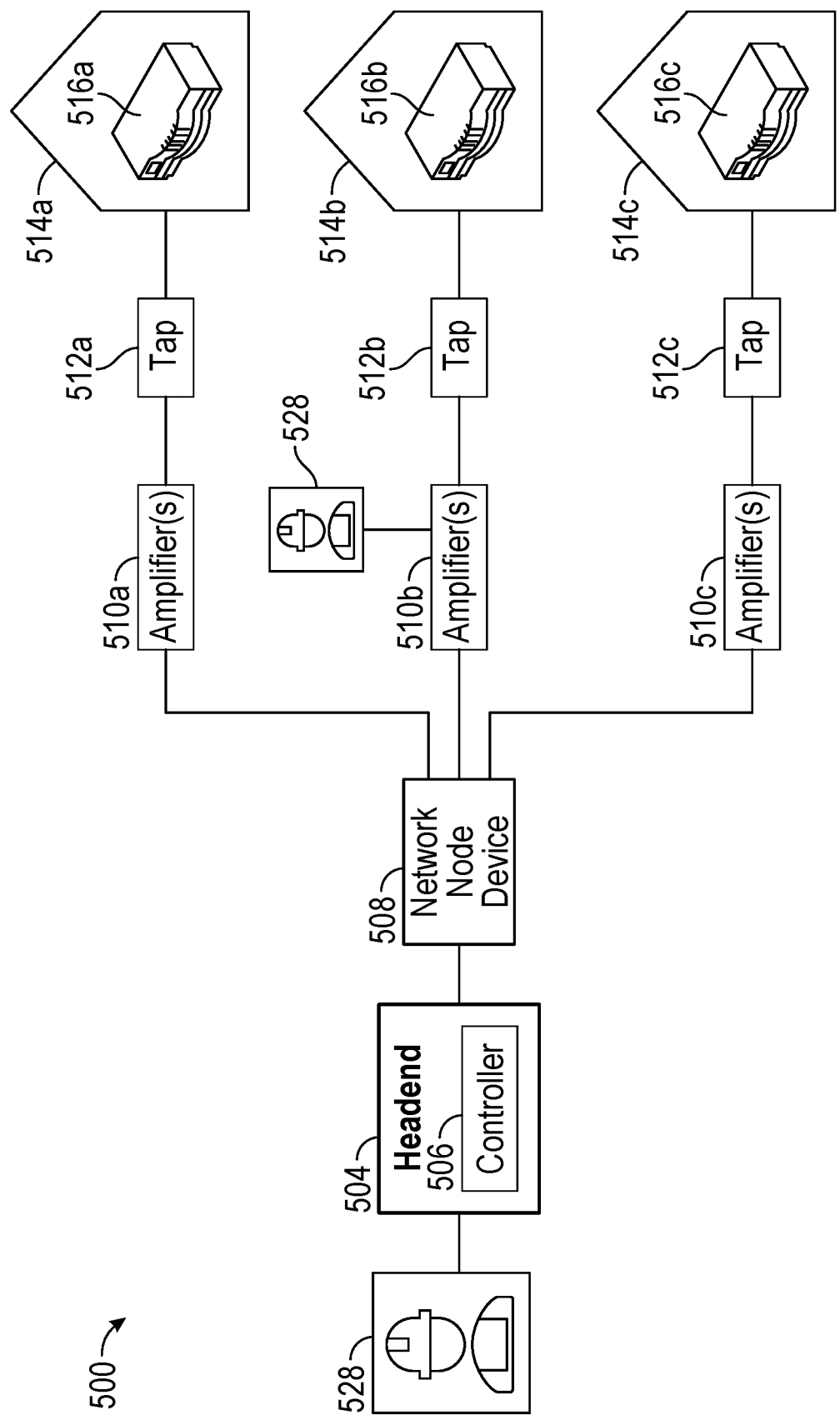

FIG. 5 shows example diagrams of another cable network, in accordance with example embodiments of the disclosure.

Figure 6:
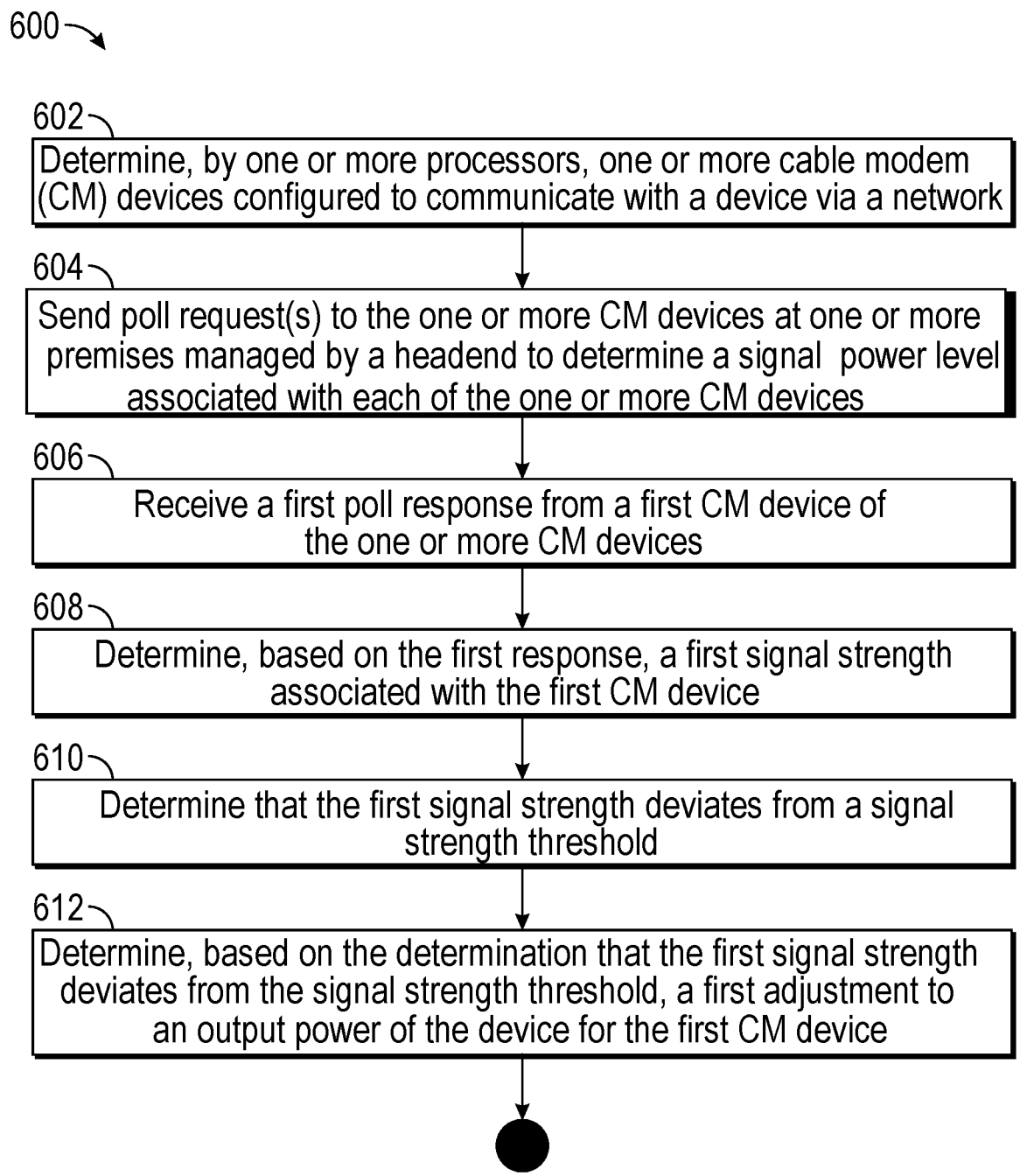

FIG. 6 illustrates an example flow diagram showing a method for auto-adjustment of signal quality, in accordance with one or more example embodiments of the present disclosure.

Figure 7:
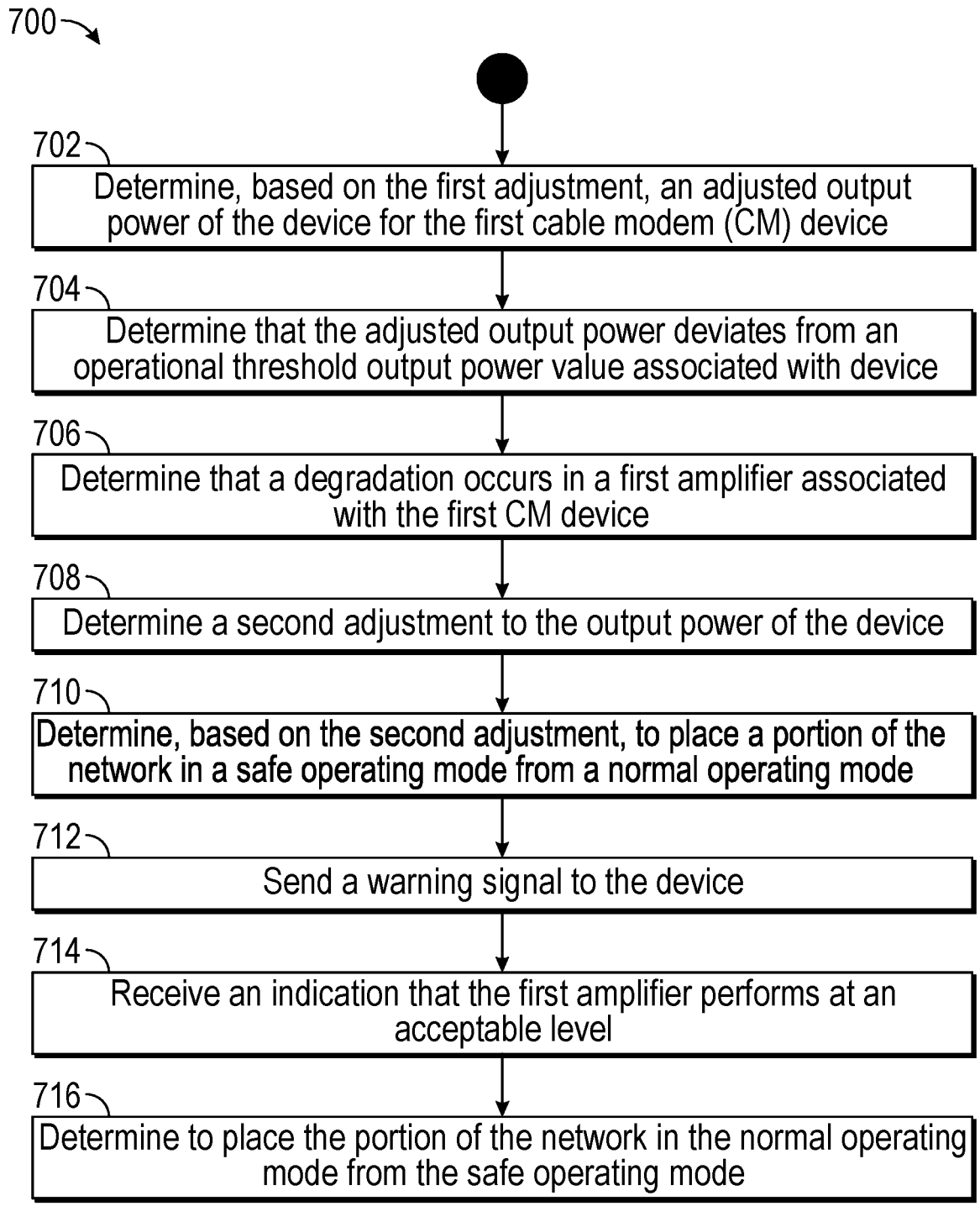

FIG. 7 illustrates an example flow diagram showing a method for placing a cable network in a safe operating mode, in accordance with one or more example embodiments of the present disclosure.

DETAILED DESCRIPTION

Illustrative embodiments will now be described more fully hereinafter with reference to the accompanying drawings, in which some, but not all embodiments are shown. The disclosure may be embodied in many different forms and should not be construed as limited to the embodiments set forth herein; rather, these embodiments are provided so that this disclosure will satisfy applicable legal requirements. Like numbers refer to like elements throughout.

Example aspects of the present disclosure are directed to methods and systems for auto-adjustment of signal quality. Signal quality between a headend and user devices (e.g., cable modems) are generally affected by fluctuation in temperature and/or humidity of a surrounding environment of the cable modems. In turn, due to the affected signal quality, a user experience may be greatly reduced. To improve the signal quality and user experience, the example aspects of the present disclosure may automatically adjust signal strength between various components of a network to compensate for the signal fluctuations caused by changes in the temperature and/or humidity.

In some applications, Data Over Cable Service Interface Specification (DOCSIS) may refer to an international telecommunications standard, which may facilitate the addition of high-speed data transfer to a cable system. DOCSIS may be deployed by operators to provide Internet access over, for example, hybrid fiber-coaxial (HFC) infrastructure. In some applications, a DOCSIS architecture may include two primary components: a cable modem (CM) located at the customer premises and a cable modem termination system (CMTS) located at the headend. Cable systems supporting on-demand programming may use a hybrid fiber-coaxial system. Fiber optic lines may bring digital signals to nodes in the system, where they may be converted into radio frequency (RF) channels and modem signals on coaxial trunk lines. A CMTS may be a device that hosts downstream and upstream ports. Signals may propagate between the headend and the cable modems via one or more amplifiers and one or more tap or terminators that are external to households using the cable modems. During signal propagation through RF channels between the headend and cable modems, outdoor temperature and/or humidity may change across different locations (e.g., across various aerial locations and/or underground locations, across various geographical locations, etc.), and/or may change hourly, daily and/or seasonally due to various weather conditions and/or climate conditions. Indoor temperature and/or humidity may also change due to air conditioning and/or humidity controlling. The changes in outdoor and indoor temperature and/or humidity may result in fluctuation in signal strength (e.g., packet loss, interference from cellular systems, from frequency modulation (FM), downstream received power and/or received signal strength indicator (RSSI)) across the RF channels, thereby degrading the signal quality and resulting in poor user experience when consuming services (e.g., Internet-based services, digital TV, video on demand, telephony, data, and the like) are provided for a user through the DOCSIS. Conventional systems and methods may dispatch a technician to locations, where an issue occurs due to fluctuations in the signal strength (e.g., a neighborhood where a plurality of the cable modems may be having issues). The technician would attempt to fix the issues by manually adjusting the one or more amplifiers (e.g., increase or decrease gains of the one or more amplifiers, and/or adjust other suitable settings of amplifiers), thereby adjusting the signal strength associated with cable modems to acceptable signal strength. Typically, tuning and adjusting the signal strength associated with these cable modems would be done outside the premises or inside the premises. However, after the gain and/or the other settings are adjusted, the signal strength may again fluctuate due to additional changes in the temperature/humidity (e.g., bad weather, air conditioning, or the like), and the resulting issues would not be corrected until the next technician is sent to the locations. Therefore, the conventional system and methods are time-consuming and are incapable of adjusting the signal strength timely, efficiently, and accurately.

According to example aspects of the present disclosure, the systems and methods of the present disclosure may automatically adjust the output power of a headend by first polling cable modems at various intervals (e.g., every 2 hours per day), and then may determine signal strength associated with these cable modems. For example, if the detected signal strength, between the headend and a cable modem, is greater than a signal strength threshold, the systems and methods may reduce the output power of the headend to decrease the signal strength of the cable modem such that the signal strength does not deviate from the signal strength threshold. If the detected signal strength, between the headend and the cable modem, is less than the signal strength threshold, the systems and methods may increase the output power of the headend to increase the signal strength such that the signal strength satisfies the signal strength threshold. As such, the systems and methods may provide a closed-loop system to automatically and dynamically adjust the signal strength timely, efficiently, and accurately without the need for sending technicians to manually adjust the amplifiers.

In some embodiments, the systems and methods may dynamically determine current data and/or historical data associated with signal strength for one or more RF channels between the headend and the cable modems serviced by the headend. An RF channel in DOCSIS may refer to a channel for upstream communications and/or downstream communications between a headend and a cable modem. The RF channel may transmit data using various techniques, such as frequency division duplexing (FDD) or time division duplexing (TDD). In FDD, a first part of an RF spectrum of the RF channel may be allocated for upstream traffic, and a second part of the RF spectrum may be allocated for downstream traffic over the network. In some embodiments, the RF spectrum of the RF channel may be in a frequency range from approximately 5 MHz to approximately 1.2 GHz. In TDD, the upstream and downstream traffic may share the same RF spectrum but may take different time periods for the upstream and downstream traffic, respectively. In full-duplex DOCSIS, the upstream and downstream traffic may use the same RF spectrum simultaneously. Accordingly, in some embodiments, the systems and methods may determine current data and/or historical data associated with signal strength in one or more RF spectra of the RF channel. For instance, in FDD, the systems and methods may determine current data and/or historical data associated with signal strength in a first part of an RF spectrum for upstream traffic, and determine current data and/or historical data associated with signal strength in a second part of an RF spectrum for the downstream traffic. In TDD, the systems and methods may determine current data and/or historical data associated with signal strength in the same RF spectrum for upstream traffic during a first time period and downstream traffic during a second time period. In full-duplex DOCSIS, the systems and methods may determine current data and/or historical data associated with signal strength in the same RF spectrum during the same time period for both upstream and downstream traffic.

In some embodiments, the systems and methods may generate instructions to set a cable network in a safe mode from a normal mode until technicians remedy issues caused by signal fluctuations if systems and methods determine that adjusting the output power of the headend is not sufficient to correct the signal fluctuations. For instance, a system may determine that an output power of the headend needed to correct the signal fluctuations deviates from an operational threshold output power value (e.g., minimum output power, or maximum output power). The system may generate a warning signal and send the warning signal and/or information associated with the signal fluctuations to operators. The system may place the portion of the network in a state that allows a technician to be able to tune the amplifiers. This may reduce the impact of the impairment. For example, if an amplifier is degraded by a certain percentage (e.g., 50% or more), then cable modems associated with that amplifier will be at almost a loss of service. The system may compensate for the amplifier degradation by adjusting the signal from the headend, but at the same time, the system may still dispatch a technician to address the issue at the amplifier. After the technician addresses the issue and corrects the amplifier's degradation, the system would recognize that the amplifier is performing at the desired levels and may readjust the signal to its normal operating mode since the issue is corrected.

In some embodiments, the systems and methods may estimate an adjustment to an output power of a headend based on current data and/or historical data associated with the signal strength of one or more cable modems. For instance, a system may perform a polling operation to check signal strength associated with one or more cable modems at various intervals (e.g., every 2 hours per day), e.g., a system may send one or more poll requests to the one or more cable modems at predefined time intervals. The system may receive poll responses from the one or more cable modems, and the system may measure a downstream received power in decibels (dB), and/or a received signal strength indicator (RSSI) based on the poll responses. A downstream received power may describe a power level received at receiving devices (e.g., cable modems) from a headend. An RSSI is a measurement of the RF power present in a received signal at receiving devices. The downstream received power and/or RSSI may be generally expressed in decibels (dB), or decibels with reference to one milliwatt (dBm). The greater the downstream received power and/or RSSI value, the stronger the received signal. When an RSSI value is represented in a negative form (e.g., −100 dB), the closer the value is to 0, the stronger the received signal has been. Fluctuations of indoor and/or outdoor temperature/humidity may result in fluctuations of the downstream received power and/or RSSI values. In some embodiments, the downstream received power and/or RSSI values from the same cable modem may be different from a first time period to a second time period. For example, due to a temperature/humidity change hourly, daily and/or seasonally, the downstream received power and/or RSSI values from the same cable modem may be different hourly (e.g., from a first hour to a second hour), daily (e.g., from a first day to a second day, and/or seasonally (e.g., from a first season to a second season). In some embodiments, the downstream received power and/or RSSI values from the same cable modem may be different during the same period. For example, the downstream received power and/or RSSI values from the same cable modem may be different during a couple of hours, during the same day, or during the same season. The system may determine a difference between the downstream received power and/or RSSI value and a signal strength threshold during a specific time period. If the downstream received power and/or RSSI value is greater than the signal strength threshold, the system may reduce the output power of the headend to decrease the signal strength of the cable modem such that the signal strength does not deviate from the signal strength threshold. If the downstream received power and/or RSSI value is less than the signal strength threshold, the system may increase the output power of the headend to increase the signal strength such that the signal strength satisfies the signal strength threshold. In some embodiments, the downstream received power and/or RSSI value may be determined based on current data measured based on polling a cable modem. In some embodiments, the downstream received power and/or RSSI value may be determined based on historical data (e.g., an average value of historical data during a predetermined time period). In some embodiments, a signal strength threshold may indicate a range of acceptable signal strength based on one or more technical standards.

In some embodiments, the systems and methods may predict an output power value of a headend based on current data and/or historical data associated with the signal strength of one or more cable modems. For instance, a system may train a machine-learned model using the historical data associated with signal strength and associated temperature and/or humidity values. The system may use the trained machine-learned model to predict an output power value based on the current signal strength and associated temperature/humidity. In some embodiments, the machine-learned model may include one or more supervised machine-learned models, one or more unsupervised machine-learned models, one or more neural networks (e.g., deep neural networks) or any other multi-layer non-linear models. A neural network may include a recurrent neural network (e.g., a long short-term memory recurrent neural network), a feed-forward neural network, or any other form of a neural network.

In some embodiments, in DOCSIS, a headend may include a CMTS, which may also be referred to as an access controller, a controller, and/or a node herein. The headend may have a converged cable access platform (CCAP) functionality. In some embodiments, the headend may serve as a remote physical (PHY) device, that is, a device having PHY layer functionality (that is, PHY layer functionality as described in connection with the open systems interconnection model, OSI model). A fiber may be connected to the headend, and the headend may further be connected to various network cable taps, also referred to as taps or terminations herein, and may connect to various cable modem (CM) devices, for example, at various households. In some embodiments, a cable network may include a fiber-optic network, which may extend from the cable operators' headend out to a neighborhood's hub site, and finally to a coaxial cable node which serves customers, for example, 25 to 2000 households. In some embodiments, data may be transmitted downstream from the headend to one or more households over drop cables using one or more taps. During signal prorogation between the headend and the taps over fibers and between the taps and the households over one or more drop cables, the fibers and/or the drop cables may be affected by changes in temperature/humidity and such affection may cause signals to undergo various impairments that lead to signal strength fluctuations. The systems and methods of the present disclosure may automatically and dynamically adjust the output power of the headend timely, efficiently, and accurately to compensate the signal strength fluctuations caused by the fibers and drop cables using downstream received power and/or RSSI values associated with CM devices at the households and/or prediction models as described above, without sending technicians to manually adjust the one or more amplifiers or the taps located in the neighborhood of the one or more households.

In some embodiments, the systems and methods may take various measurements associated with signal strength of cable modems, for example, measurements to characterize one or more channels associated with signals outputted by the cable modems, but not limited to, signal-to-noise ratio (SNR) measurements, modulation error ratio (MER) measurements, slopes measurements, amplitude measurements, ripple measurements, spike (for example, non-linear noise distortions) measurements, absolute received power per subcarrier measurements, error vector magnitude measurements, and the like.

In some embodiments, the DOCSIS may include at least one of (i) a DOCSIS 1.0, (ii) a DOCSIS 2.0, (iii) a DOCSIS 3.0, (iv) a DOCSIS 3.1, or (v) a DOCSIS 4.0 specification.

Other embodiments of this aspect include corresponding systems, apparatuses, and computer programs configured to perform the actions of the methods encoded on computer storage devices.

Particular embodiments of the subject matter described herein can be implemented to realize one or more of the following advantages, such as improving signal quality, network stability, network performance and, in turn, improving the user experience, reducing the costs associated with deploying and maintaining networks and in turn increase profit margin, and/or extending the reach of networks to provide wider coverage and in turn increasing revenue.

The details of one or more embodiments of the subject matter described herein are outlined in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities.

Embodiments of the present disclosure may be implemented in various ways, including computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 illustrates an example embodiment of the present disclosure. As shown in FIG. 1, this particular embodiment may include one or more network computing entities 100, one or more networks 105, and one or more user devices 110a-110f. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

FIG. 2 provides a schematic of a network computing entity 200 according to one embodiment of the present disclosure. The network computing entity 200 may be one embodiment of the network computing entity 100 shown in FIG. 1. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the network computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. For instance, the network computing entity 200 may communicate with the user devices 110a-110f, and/or a variety of other computing entities.

As shown in FIG. 2, in one embodiment, the network computing entity 200 may include or be in communication with one or more processing elements 205 (also referred to as processors, processing circuitry, and/or similar terms used herein interchangeably) that communicate with other elements within the network computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field-programmable gate arrays (FPGAs), programmable logic arrays (PLAs), hardware accelerators, other circuitry, and/or the like. As will, therefore, be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the network computing entity 200 may further include or be in communication with non-volatile media (also referred to as non-volatile storage, memory, memory storage, memory circuitry, and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the network computing entity 200 may further include or be in communication with volatile media (also referred to as volatile storage, memory, memory storage, memory circuitry, and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the network computing entity 200 with the assistance of the processing element 205 and operating system.

As indicated, in one embodiment, the network computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the network computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the network computing entity 200 may include or be in communication with one or more input elements, such as a keyboard input, a mouse input, a touch screen/display input, motion input, movement input, audio input, pointing device input, joystick input, keypad input, and/or the like. The network computing entity 200 may also include or be in communication with one or more output elements (not shown), such as audio output, video output, screen/display output, motion output, movement output, and/or the like.

As will be appreciated, one or more components of the network computing entities 200 may be located remotely from other network computing entity 200 components, such as in a distributed system. Furthermore, one or more of the components may be combined, and additional components performing functions described herein may be included in the network computing entity 200. Thus, the network computing entity 200 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 300 that includes one or more components that are functionally similar to those of the network computing entity 100. FIG. 3 provides an illustrative schematic representative of a user device 300 that can be used in conjunction with embodiments of the present disclosure. The user device 300 may be one embodiment of the user devices 110a-110f, as shown in FIG. 1. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. The user device 300 can be operated by various parties. As shown in FIG. 3, the user device 300 may include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and the receiver 306, respectively.

The signals provided to and received from the transmitter 304 and the receiver 306, respectively, may include signaling information in accordance with air interface standards of applicable wireless systems. In this regard, the user device 300 may be capable of operating with one or more air interface standards, communication protocols, modulation types, and access types. More particularly, the user device 300 may operate in accordance with any of a number of wireless communication standards and protocols, such as those described above with regard to the network computing entity 100. In a particular embodiment, the user device 300 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 300 may operate in accordance with multiple wired communication standards and protocols, such as those described above with regard to the network computing entity 100 via a network interface 320.

Via these communication standards and protocols, the user device 300 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 300 can also download changes, add-ons, and updates, for instance, to its firmware, software (e.g., including executable instructions, applications, program modules), and operating system.

According to one embodiment, the user device 300 may include location determining aspects, devices, modules, functionalities, and/or similar words used herein interchangeably. For example, the user device 300 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 300 position in connection with a variety of other systems, including cellular towers, Wi-Fi access points, and/or the like. Similarly, the user device 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including, RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 300 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 300 to interact with and/or cause display of information from the network computing entity 100, as described herein. The user input interface can comprise any of a number of devices or interfaces allowing the user device 300 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 300 can also include volatile storage or memory 322, and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 300. As indicated, this may include a user application that is resident on the entity or accessible through a browser or other user interface for communicating with the network computing entity 100 and/or various other computing entities.

In another embodiment, the user device 300 may include one or more components or functionality that are the same or similar to those of the network computing entity 100, as described in greater detail above. As will be recognized, these architectures and descriptions are provided for example purposes only and are not limiting to the various embodiments.

FIG. 4 shows an example diagram of a portion of a cable network 400 and associated devices in a particular network deployment, in accordance with example embodiments of the disclosure. In some aspects, the cable network 400 described herein may be implemented using a DOCSIS specification or equivalent specification. In some embodiments, the cable network 400 may include a fiber-optic network that may extend from a headend out to a neighborhood's hub site, and finally to a coaxial cable node which serves customers at several households, for example, 25 to 2000 households.

As shown in FIG. 4, a headend device 404 is connected to a network cable tap 406 via a fiber 408. The network cable tap 406 includes amplifier(s) 410 located in a neighborhood, including households 412a and 412b, to ensure that signal levels or SNR levels associated with the signal are sufficient to transfer data from the households 412a and 412b to the tap 406 and/or the headend device 404. The tap 406 may connect to cable modem (CM) devices 414a and 414b at the households 412a and 412b. Data may be transmitted between the tap 406 and the households 412a and 412b over drop cables 416a and 416b. A controller 418 connects the headend device 404 and the households 412a and 412b via the tap 406. The controller 418 may perform an auto-adjustment of signal quality between the headend device 404 and the CM devices 414a and 414b.

The headend device 404 may include a CMTS. The headend device 404 may include a converged cable access platform (CCAP) device. CCAP may refer to equipment that combines aspects of the functionality of edge quadrature amplitude modulation (QAM) technology with CMTSs to provide services such as internet and voice over the Internet Protocol (IP), while encoding and transmitting digital video channels over the cable network. Additionally, and/or alternatively, the headend device 404 may include a network node device, for example, a network node device such as remote physical (PHY) device, remote medium access control (MAC) device, and/or remote hybrid PHY/MAC device. The remote PHY device may be a device having PHY layer functionality (that is, PHY layer functionality as described in connection with the open systems interconnection model, OSI model). In some embodiments (not shown in FIG. 4), the network node device may be external to the headend device 404. The headend device 404 may be electronically connected to the network node device via a cable (e.g., a fiber optic cable). In some embodiments (not shown in FIG. 4), the headend device 404 may include a switch, for example, a network switch such as an Ethernet switch.

In some embodiments, the headend device 404 may be configured to provide a downstream signal (e.g., a downstream broadband signal) to the CM devices 414a and 414b, and receive upstream signals from the CM devices 414a and 414b. The headend device 404 may be configured (i) to receive the downstream signal via the tap 406, the fiber 408 and the drop cables 416a and 416b, (ii) convert the downstream signal into a radio frequency downstream signal, (iii) output the downstream signal onto one or more cable lines (for example, the fiber 408 and the drop cables 416a and 416b) for communication to the CM devices 414a and 414b, (iv) receive the upstream signals via the one or more cable lines, and (v) convert the received upstream signals into light signals for communication to the headend device 404. The tap 406 may be configured to output the radio frequency downstream signal for receipt by the CM devices 414a and 414b, and direct the communication of the upstream signals to the headend device 404. Any number of modulation techniques, and/or data standards may be utilized by the cable network 400. For example, television data may be modulated utilizing a suitable quadrature amplitude modulation (QAM) or other modulation technique, and the modulated data may be incorporated into data signal (e.g., broadband data signal). As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the data signal. The data signal may be configured to provide a wide variety of services to one or more households, including but not limited to, television service, telephone service, Internet service, home monitoring service, security service, etc.

The amplifier(s) 410 may amplify signal. For example, the amplifier(s) 410 may increase the amplitude of the signal. In certain embodiments, the various components of a signal (e.g., low return path, forward path, high return path) may be amplified by respective amplification components of the amplifier(s) 410. Each amplified signal may then be output onto or driven back onto the cable line in a direction for the signal. Any number of diodes or other suitable devices may be incorporated into the amplifier(s) 410 in order to prevent or limit undesired leakage of an amplified signal in a direction from which the signal was received. For example, the amplifier(s) 410 may receive a return path signal from the households 412a and 412b or other amplifiers that may be external to the tap 406, the amplifier(s) 410 may amplify the signal, and the amplifier(s) 410 may output the signal in an upstream direction towards the headend device 404 while limiting the output or leakage of the signal in a downstream direction.

In some embodiments, the amplifier(s) 410 may include a wide variety of gains that may be utilized for different components of a signal. In certain embodiments, the amplifier(s) 410 may be powered by a received signal, such as a received downstream signal. Additionally, or alternatively, the amplifier(s) 410 may be powered by one or more batteries and/or external power sources. In certain embodiments, the power requirements of the amplifier(s) 410 may be based at least in part on the modulation technique(s) utilized in association with the signals that are amplified. In one example embodiment, a relatively low power amplifier(s) 410 may be provided in association with an OFDMA modulation technique.

In some embodiments (not shown in FIG. 4), the amplifier(s) 410 may be external to the tap 406. A variable number of amplifiers may be located between the headend device 404 and the households 412a and 412b. For example, the amplifier(s) 410 may be located between the headend device 404 and the tap 406. The tap 406 may connect and serve any number of households. For example, in certain embodiments (not shown in FIG. 4), up to four households may be serviced by the tap 406.

The controller 418 may perform an auto-adjustment of signal quality between the headend device 404 and the CM devices 414a and 414b. The signal quality between the headend device 404 and the CM devices 414a and 414b may be affected by fluctuation in outdoor temperature and/or humidity 420 and indoor temperature and/or humidity 422a and 422b associated with a surrounding environment of the CM devices 414a and 414b. During signal propagation between the headend device 404 and CM devices 414a and 414b, outdoor temperature and/or humidity 420 may change across different locations (e.g., across various aerial locations and/or underground locations, across various geographical locations, etc.), and/or may change hourly, daily and/or seasonally due to various weather conditions and/or climate conditions. Additionally, the fibers 408 and/or the drop cables 416a and 416b may be affected by changes in the outdoor temperature/humidity 420 and may cause signals to undergo various impairments. The indoor temperature and/or humidity 422a and 422b may change due to air conditioning and/or humidity controlling. The changes in outdoor and indoor temperature and/or humidity 420, 422a and 422b may result in fluctuation in signal strength. The controller 418 may automatically adjust output power of the headend device 404 by polling the CM devices 414a and 414b at various intervals (e.g., every 2 hours per day), and then may determine signal strength associated with a particular CM device (e.g., a CM device 414a or a CM device 414b). The controller 418 may determine a difference between the signal strength associated with the particular CM device (e.g., the CM device 414a or the CM device 414b) and a signal strength threshold and may increase or decrease the output power of the headend device 404 based on the determined difference. For instance, as shown in FIG. 4, the controller 418 simultaneously or sequentially sends a poll request 424 to the CM devices 414a and 414b at predefined time intervals to determine a signal power level associated with each of the one or more CM devices 414a and 414b. The controller 418 receives simultaneously or sequentially poll responses 426a and 426b from the CM devices 414a and 414b. The controller 418 may measure a downstream received power and/or a received signal strength indicator (RSSI) for each of the CM devices 414 based on the poll responses 426a and 426b. The controller 418 may determine a difference between a downstream received power and/or RSSI value associated with a particular CM device (e.g., the CM device 414a or the CM device 414b) and a signal strength threshold. If the downstream received power and/or RSSI value is greater than the signal strength threshold, the controller 418 may reduce the output power of the headend device 404 to decrease the signal strength of the particular device (e.g., the CM device 414a or the CM device 414b) such that the signal strength does not deviate from the signal strength threshold. If the downstream received power and/or RSSI value is less than the signal strength threshold, the controller 418 may increase the output power of the headend device 404 to increase the signal strength such that the signal strength satisfies the signal strength threshold.

As shown in FIG. 4, the controller 418 is external to the headend device 404, the tap 406 and/or the households 412a and 412b. In some embodiments (not shown in FIG. 4), the controller 418 may be included in the headend device 404, in the tap 406, in the CM devices 414a and 414b, and/or in one or more households 412a and 412b. In some embodiments, the headend device 404 may connect multiple taps, and each of the multiple taps may connect one or more households.

In some embodiments, a given transmitting device (e.g., the headend device 404, the CM devices 414a and 414b, and/or the controller 418) on the network may transmit a pre-determined sequence, for example, a 32-symbol (or any suitable number of symbol) sequence where each symbol includes a pre-determined amount of data, to receiving devices (e.g., the headend device 404, the CM devices 414a and 414b, and/or the controller 418). Accordingly, when the receiving devices receive the pre-determined sequence, the receiving devices may be programmed to be able to determine one or more characteristics that the signal associated with the received pre-determined sequence should have. In some embodiments, the receiving devices may take various measurements, for example, measurements to characterize one or more channels associated with signals received by the receiving devices, and/or one or more measurements associated with the received signal from the transmitting devices, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, and the like. The receiving devices may then transmit at least portions of the measurements in informational blocks, for example, as data packets, back to the transmitting devices. The transmitting devices may modify a table based on the received information from the receiving devices, for example, a table stored in internal memory. In some embodiments, the table may include information such as what sequence the receiving devices would have received absent any fluctuations/distortions to the signal, what sequence the receiving device actually received, what sequence the transmitting device received back from the receiving device (which may also be subject to further fluctuations/distortions), and/or any information indicative of the measurements taken by the receiving devices of the channels and/or the received signals, as described above.

In some embodiments, the controller 418 may generate instructions to set a cable network in a safe mode from a normal mode until technicians 428 remedy issues caused by signal fluctuations if the controller 418 determines that adjusting the output power of the headend device 404 is not sufficient to correct the signal fluctuations. For instance, the controller 418 may determine that an output power of the headend device 404 needed to correct the signal fluctuations deviates from an operational threshold output power value (e.g., minimum output power, or maximum output power). For example, if a signal strength associated with a particular CM device (e.g., the CM device 414a or the CM device 414b) is greater than the signal strength threshold, the controller 418 may reduce the output power of the headend device 404. However, the controller 418 may reduce the output power of the headend device 404 to the minimum output power of the headend device 404, but the signal strength is still greater than the signal strength threshold. If the signal strength is less than the signal strength threshold, the controller 418 may increase the output power of the headend device 404. However, the controller 418 may increase the output power of the headend device 404 to the maximum output power of the headend device 404, but the signal strength is still less than the signal strength threshold. The controller 418 may generate a warning signal and send the warning signal and/or information associated with the signal fluctuations to the headend device 404 and/or operator(s) 428 (e.g., technician). The controller 418 may determine that a degradation of the amplifier(s) 410 occurs, and corrective action is needed to correct the amplifier's degradation. The controller 418 may place the portion of the cable network 400 in a state that allows the operator(s) 428 to be able to tune the amplifier(s) 410. The controller 418 may adjust the signal from the headend device 404, but at the same time, the controller 418 may dispatch the operator(s) 428 to address the issue at the amplifier(s) 410. After the technician 428 addresses the issue and corrects the amplifier's degradation, the controller 418 may receive an indication that the amplifier is performing at the desired levels, and readjust the cable network 400 to its normal operating mode since the issue is corrected.

In some aspects, the cable network 400, as described above may include a regional or area headend/hub. The hub can receive programming that is encoded, modulated, and upconverted onto RF carriers, combined onto a single electrical signal and inserted into a broadband transmitter, for example, an optical transmitter. In some embodiments, the transmitter may convert the electrical signal to a downstream modulated signal that is sent to nodes. Fiber optic cables may connect the headend or hub to nodes in various topologies, including, but not limited to, point-to-point or star topologies, ring topologies, and the like.

By using frequency-division multiplexing, an HFC network such as the one described in connection with FIG. 4 may carry a variety of services, for example, analog and digital TV, video on demand, telephony, data, and the like. Services on these systems can be carried on RF signals in particular regions of the available spectrum.

The HFC network may be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another aspect, a return-path or upstream signals can refer to information from the customer to the headend/hub office. The forward-path and the return-path can be carried over the same coaxial cable in both directions between the node and the customer equipment.

In some embodiments, HFC network may be structured to be asymmetrical, that is, data transmission in the downstream direction has much more data-carrying capacity than the upstream direction. Full Duplex can refer to a network specification that can improve upon DOCSIS 3.1 to use the full spectrum of the cable plant (for example, from approximately 0 MHz to approximately 1.2 GHz) at the same time in both upstream and downstream directions. This technology may facilitate multi-gigabit symmetrical services while remaining backward compatible with DOCSIS 3.1.

FIG. 5 shows example diagrams of another cable network 500, in accordance with example embodiments of the disclosure. In some aspects, the cable network 500 described herein may be implemented using a DOCSIS specification. As shown in FIG. 5, a headend device 504 including a controller 506 connects CM devices 516a-516c of the households 514a-514c via a network node device 508, amplifier(s) 510a-510c, and network cable taps 512a-512c. In some embodiments, the headend device 504 may be one embodiment of the headend device 404, the controller 506 may be one embodiment of the controller 418, the amplifier(s) 510a-510c may be one embodiment of the amplifier(s) 410, and the tap 512a, 512b, or 512c may be one embodiment of the tap 406. The network node device 508 may be a remote physical (PHY) device, a remote medium access control (MAC) device, and/or a remote hybrid PHY/MAC device. In some embodiments, the network node device 508 may be included in the headed device 504.

Data may be transmitted between the headend device 504 and the households 514a-514c over cable lines (e.g., fiber, drop lines, or the like). The controller 506 may perform an auto-adjustment of signal quality between the headend device 504 and the CM devices 516a-516c. FIG. 5 provides 3 node-split embodiments, where each of the 3 node splits may have a variable number of amplifiers 510a-510c. In some embodiments (not shown in FIG. 5), the number of node splits at the network node device 508 of the headend device 504 may be less than or more than the number of node splits shown in FIG. 5.

The amplifier(s) 510a-510c located between the headed device 504 and the taps 512a-512c may amplify the signal. For example, the amplifier(s) 510a-510c may increase the amplitude of the signal. Each of the amplifier(s) 510a-510c is associated with each of the households 514a-514c.

The controller 506 may perform an auto-adjustment of signal quality between the headend device 504 and the CM devices 516a-516c. The controller 506 may automatically adjust output power of the headend device 504 by polling the CM devices 516a-516c at various intervals (e.g., every 2 hours per day), and then may determine signal strength associated with a particular CM device (e.g., a CM device 516a, 516b, or 516c). The controller 506 may determine a difference between the signal strength associated with the particular CM device (e.g., the CM device 516a, 516b, or 516c) and a signal strength threshold and may increase or decrease the output power of the headend device 504 based on the determined difference. The controller 506 may simultaneously or sequentially send one or more poll requests to the CM devices 516a-516c at predefined time intervals to determine a signal power level associated with each of the CM devices 516a-516c. The controller 506 may receive simultaneously or sequentially poll responses from the CM devices 516a-516c. The controller 506 may measure a downstream received power and/or a received signal strength indicator (RSSI) for each of the CM devices 516a-516c based on the poll responses, and the controller 506 may increase or decrease the output power of the headend device 504 based on the poll responses.

The controller 506 may generate instructions to set the cable network 500 in a safe mode from a normal mode until technicians 528 remedy issues caused by signal fluctuations if the controller 506 determines that adjusting the output power of the headend device 504 is not sufficient to correct the signal fluctuations. For instance, the controller 506 may determine that an output power of the headend device 504 needed to correct the signal fluctuations associated with a particular CM device (e.g., a CM device 516a, 516b, or 516c) deviates from an operational threshold output power value (e.g., minimum output power, or maximum output power). The controller 506 may generate a warning signal and send the warning signal and/or information associated with the signal fluctuations to the headend device 504 and/or operator(s) 528 (e.g., technician). The controller 506 may adjust the signal from the headend device 504, but at the same time, the controller 506 may dispatch the operator(s) 528 to address the issue at the amplifier(s) 510a-510c associated with the particular CM device (e.g., the CM device 516a, 516b, or 516c). After the technician 528 addresses the issue and corrects the amplifier's degradation, the controller 506 may receive an indication that the amplifier is performing at the desired levels, and readjust the cable network 500 to its normal operating mode since the issue is corrected.

FIG. 6 illustrates an example flow diagram showing a method 600 for auto-adjustment of signal quality, in accordance with one or more example embodiments of the present disclosure. In FIG. 6, computer-executable instructions of one or more module(s) of the cable network 400 and/or the cable network 500, such as the controller 418 and/or the controller 506 may be executed to perform the auto-adjustment of signal quality.

At block 602 of the method 600 in FIG. 6, the method includes determining, by one or more processors, one or more cable modem (CM) devices configured to communicate with a device via a network. For instance, one or more CM devices may be determined to communicate with a headend device via a cable network. Examples are described with respect to FIG. 4 and FIG. 5.

Block 604 of the method 600 includes sending a poll request to the one or more CM devices to determine a signal power level associated with each of the one or more CM devices. For instance, a controller may send one or more poll requests to the one or more CM devices at one or more premises managed by a headend to determine a signal power level associated with each of the CM devices. Examples are described with respect to FIG. 4 and FIG. 5.

In some embodiments, to send one or more poll requests, the controller may send the poll request at various intervals (e.g., every 2 hours per day), e.g., the controller may send a signal strength poll request to the one or more CM devices at predefined time intervals. For instance, the controller may determine a first time slot and may send a first poll request to the CM devices during the first time slot. The controller may determine a second time slot. A time interval between the first time slot and the second time slot is predetermined e.g., substantially real-time, every few minutes, every few hours during a day or a predetermined time period. The controller may send a second poll request to the CM devices during the second time slot. The controller may receive the first poll response from the first CM device during the first time slot, and receive a second poll response from the first CM device during the second time slot. The controller may determine, based on the second poll response, a second signal strength associated with the first CM device. The controller may determine whether or not the second signal strength satisfies the signal strength threshold. If the controller determines that the second signal strength deviates from the signal strength threshold, the controller may determine a second adjustment to the output power of the headend device. In some embodiments, the controller may determine a first adjusted output power of the headend device based on the first adjustment, and may further adjust the first adjusted output power of the headend device based on the second adjustment. If the controller determines that the second signal strength satisfies the signal strength threshold, the controller may determine to maintain the first adjusted output power of the headend device for the first CM device.

Block 606 of the method 600 includes receiving a first poll response from a first CM device of the one or more CM devices. For instance, the controller may receive a first poll response from a first CM device of the one or more CM devices. Examples are described with respect to FIG. 4 and FIG. 5.

Block 608 of the method 600 includes determining, based on the first poll response, a first signal strength associated with the first CM device. For instance, the controller may determine, based on the first poll response, a first signal strength associated with a downstream received power and/or a received signal strength indicator (RSSI) received at the first CM device. Examples are described with respect to FIG. 4.

Block 610 of the method 600 includes determining that the first signal strength deviates from a signal strength threshold. For instance, the controller may determine that the first signal strength deviates from a signal strength threshold. Examples are described with respect to FIG. 4 and FIG. 5.

Block 612 of the method 600 includes determining, based on the determination that the first signal strength deviates from the signal strength threshold, a first adjustment to an output power of the device for the first CM device. For instance, the controller may determine that the first signal strength is less than the signal strength threshold, and then the controller may determine to increase the output power of the headend device. As another example, the controller may determine that the first signal strength is greater than the signal strength threshold, the controller may determine to decrease the output power of the headend device. Examples are described with respect to FIG. 4 and FIG. 5.

In some embodiments, to determine the first adjustment to the output power of the headend device, the controller may determine historical signal strength associated with the first CM device. For instance, the controller may access a database that stores previously measured signal strength associated with the first CM device and associated information (e.g., timestamps, temperature, humidity, adjustments, adjusted output power values of the headend device, or the like). The controller may determine, based on the first signal strength and the historical signal strength, an estimated adjustment. For instance, the controller may look for a look-up table that stores signal strength values and corresponding output power values of the headend device) to find a corresponding output power value of the headend device based on the first signal strength. The controller may determine a difference between a current output power value of the headend device and the corresponding output power value given in the look-up table. The controller may determine the first adjustment based on the determined difference. As another example, the controller may determine, based on the historical signal strength, a prediction model, and the controller may determine, based on the first signal strength and the prediction model, an estimated output power to be adjusted. For instance, the controller may train a machine-learned model using the historical data, including previously measured signal strength values associated with a particular CM device, output power values of the headend device associated with the corresponding previously measured signal strength values, and/or associated temperature and/or humidity values. The controller may use the trained machine-learned model to predict an output power value needed to correct a signal fluctuation based on the current signal strength.

In some embodiments (not shown in FIG. 6), the method may further include receiving a second poll response from a second CM device of the one or more CM devices. For instance, the controller may receive a second poll response from a second CM device. The method may further include determining, based on the second poll response, a second signal strength associated with the second CM device. For instance, the controller may determine, based on the second poll response, a second signal strength associated with a downstream received power or an RSSI received at the second CM device. The method may further include determining that the second signal strength satisfies the signal strength threshold. The method may further include determining, based on the determination that the second signal strength satisfies the signal strength threshold, to maintain the output power of the headend device for the second CM device. For instance, the controller may determine whether or not the second signal strength satisfies the signal strength threshold. If the controller determines that the second signal strength deviates from the signal strength threshold, the controller may determine a second adjustment to the output power of the headend device for the second CM device. If the controller determines that the second signal strength satisfies the signal strength threshold, the controller may determine to maintain the output power of the headend device for the second CM device. Examples are described with respect to FIG. 4 and FIG. 5.

FIG. 7 illustrates an example flow diagram showing a method 700 for placing a cable network in a safe operating mode, in accordance with one or more example embodiments of the present disclosure. In FIG. 7, computer-executable instructions of one or more module(s) of the cable network 400, and/or the cable network 500, such as the controller 418, and/or the controller 506 may be executed to perform the auto-adjustment of signal quality.

At block 702 of the method 700 in FIG. 7, the method includes determining, based on the first adjustment, an adjusted output power of the device for the first cable modem (CM) device. For instance, the controller may increase or decrease, based on the first adjustment, an output power of the device to obtain an adjusted output power for the first CM device. Examples are described with respect to FIG. 4 and FIG. 5.

Block 704 of the method 700 includes determining that the adjusted output power deviates from an operational threshold output power value associated with the device. For instance, the controller may determine that the adjusted output power deviates from an operational threshold output power value associated with the headend device (e.g., minimum output power, or maximum output power), if the adjusted output power is less than the minimum output power of the headend device, or if the adjusted output power is greater than the maximum output power of the headend device). Examples are described with respect to FIG. 4 and FIG. 5.

Block 706 of the method 700 includes determining that a degradation occurs in a first amplifier associated with the first CM device. For instance, the controller may determine that a degradation occurs in a first amplifier associated with the first CM device based on determining that the adjusted output power deviates from the operational threshold output power value. The controller may determine which amplifiers associated with the first CM device based on a look-up table that correlates the CM device with corresponding amplifiers.

Block 708 of the method 700 includes determining a second adjustment to the output power of the device. For instance, the controller may determine a second adjustment to the output power of the headend device to set the output power at a value that satisfies the operational threshold output power value and to allow a technician to be able to tune the amplifiers.

Block 710 of the method 700 includes determining, based on the second adjustment, to place a portion of the network in a safe operating mode from a normal operating mode. For instance, the controller may adjust the output power to an adjusted output power based on the second adjustment to enable the cable network to perform with limited functionalities to meet the basic needs of the CM devices.

Block 712 of the method 700 includes sending a warning signal to the device. For instance, the controller may send a warning signal to the headend device and/or operators. In some embodiments, the controller may dispatch a technician to address the issue at the first amplifier. Examples are described with respect to FIG. 4 and FIG. 5.

Block 714 of the method 700 includes receiving an indication that the first amplifier performs at an acceptable level. For instance, after the technician addresses the issue and corrects the amplifier's degradation, the controller may receive an indication (e.g., a notification from the headend device and/or operators) that the first amplifier is performing at the desired levels.

Block 716 of the method 700 includes determining to place the portion of the network in the normal operating mode from the safe operating mode. For instance, the controller may readjust the signal to its normal operating mode since the issue is corrected. As another example, the controller may determine a third adjustment to the output power of the headed device such that the signal strength of the first CM device satisfies the signal strength threshold and the adjusted output power satisfies the operational threshold output power value.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially-generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, a software application, a script, or code) can be written in any form of programming language, including compiled or interpreted languages, and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on the input of information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining, by one or more processors, one or more cable modem devices configured to communicate with a device via a network;
   sending one or more poll requests to the one or more cable modem devices at one or more premises managed by a headend to determine a signal power level associated with each of the one or more cable modem devices;
   receiving a first poll response from a first cable modem device of the one or more cable modem devices;
   determining, based on the first poll response, a first signal strength associated with the first cable modem device;
   determining that the first signal strength deviates from a signal strength threshold; and
   determining, based on the determination that the first signal strength deviates from the signal strength threshold, a first adjustment to an output power of the device for the first cable modem device.

2. The method of claim 1, wherein determining the first signal strength comprises determining, based on the first poll response, a downstream received power associated with the first cable modem device.

3. The method of claim 1, wherein determining the first adjustment to the output power of the device for the first cable modem device comprises:
   determining to increase the output power of the device based on a determination of the first signal strength being less than the signal strength threshold; and
   determining to decrease the output power of the device based on a determination of the first signal strength being greater than the signal strength threshold.

4. The method of claim 1, wherein sending the one or more poll requests to the one or more cable modem devices comprises:
   determining a first time slot;
   sending a first poll request to the one or more cable modem devices during the first time slot;
   determining a second time slot, wherein a time interval between the first time slot and the second time slot is predetermined; and
   sending a second poll request to the one or more cable modem devices during the second time slot.

5. The method of claim 4, further comprising:
   receiving the first poll response from the first cable modem device during the first time slot;
   receiving a second poll response from the first cable modem device during the second time slot;
   determining, based on the second poll response, a second signal strength associated with the first cable modem device;
   determining that the second signal strength satisfies the signal strength threshold; and
   determining, based on the determination that the second signal strength satisfies the signal strength threshold, to maintain an adjusted output power of the device for the first cable modem device, wherein the adjusted output power is determined based on the first adjustment.

6. The method of claim 1, further comprising:
   receiving a second poll response from a second cable modem device of the one or more cable modem devices;
   determining, based on the second poll response, a second signal strength associated with the second cable modem device;
   determining that the second signal strength satisfies the signal strength threshold; and
   determining, based on the determination that the second signal strength satisfies the signal strength threshold, to maintain the output power of the device for the second cable modem device.

7. The method of claim 1, further comprising:
   determining, based on the first adjustment, an adjusted output power of the device for the first cable modem device;
   determining that the adjusted output power deviates from an operational threshold output power value associated with the device;
   determining that a degradation occurs in a first amplifier associated with the first cable modem device;
   determining a second adjustment to the output power of the device;
   determining, based on the second adjustment, to place a portion of the network in a safe operating mode from a normal operating mode; and
   sending a warning signal to the device.

8. The method of claim 7, further comprising:
   receiving an indication that the first amplifier performs at an acceptable level; and
   determining to place the portion of the network in the normal operating mode from the safe operating mode.

9. The method of claim 1, wherein determining the first adjustment to the output power of the device for the first cable modem device comprises:
   determining historical signal strength associated with the first cable modem device; and
   determining, based on the first signal strength and the historical signal strength, an estimated adjustment.

10. The method of claim 9, wherein determining, based on the first signal strength and historical signal strength, the estimated adjustment comprises:
    determining, based on the historical signal strength, a prediction model; and
    determining, based on the first signal strength and the prediction model, an estimated output power to be adjusted.

11. A device, the device comprising processing circuitry coupled to storage, the processing circuitry configured to:
    determine one or more cable modem devices configured to communicate the device via a network;
    send one or more poll requests to the one or more cable modem devices at one or more premises managed by a headend to determine a signal power level associated with each of the one or more cable modem devices;
    receive a first poll response from a first cable modem device of the one or more cable modem devices;
    determine, based on the first poll response, a first signal strength associated with the first cable modem device;
    determine that the first signal strength deviates from a signal strength threshold; and
    determine, based on the determination that the first signal strength deviates from the signal strength threshold, a first adjustment to an output power of the device for the first cable modem device.

12. The device of claim 11, wherein to determine the first signal strength comprises to determine, based on the first poll response, a downstream received power associated with the first cable modem device.

13. The device of claim 11, wherein to determine the first adjustment to the output power of the device for the first cable modem device comprises:
   to determine to increase the output power of the device based on a determination of the first signal strength being less than the signal strength threshold; and
   to determine to decrease the output power of the device based on a determination of the first signal strength being greater than the signal strength threshold.

14. The device of claim 11, wherein sending to send the one or more poll requests to the one or more cable modem devices comprises:
   to determine a first time slot;
   to send a first poll request to the one or more cable modem devices during the first time slot;
   to determine a second time slot, wherein a time interval between the first time slot and the second time slot is predetermined; and
   to send a second poll request to the one or more cable modem devices during the second time slot.

15. The device of claim 11, wherein the processing circuitry is further configured to:
   receive a second poll response from a second cable modem device of the one or more cable modem devices;
   determine, based on the second poll response, a second signal strength associated with the second cable modem device;
   determine that the second signal strength satisfies the signal strength threshold; and
   determine, based on the determination that the second signal strength satisfies the signal strength threshold, to maintain the output power of the device for the second cable modem device.

16. A system comprising:
   at least one memory storing computer-executable instructions, and
   at least one communication interface; and
   at least one processor in communication with the at least one communications interface, and the at least one memory and configured to execute the computer-executable instructions to:
      determine one or more cable modem devices configured to communicate a device via a network;
      send one or more poll requests to the one or more cable modem devices at one or more premises managed by a headend to determine a signal power level associated with each of the one or more cable modem devices;
      receive a first poll response from a first cable modem device of the one or more cable modem devices;
      determine, based on the first poll response, a first signal strength associated with the first cable modem device;
      determine that the first signal strength deviates from a signal strength threshold; and
      determine, based on the determination that the first signal strength deviates from the signal strength threshold, a first adjustment to an output power of the device for the first cable modem device.

17. The system of claim 16, wherein to determine the first signal strength comprises to determine, based on the first poll response, a downstream received power associated with the first cable modem device.

18. The system of claim 16, wherein to determine the first adjustment to the output power of the device for the first cable modem device comprises:
   to determine to increase the output power of the device based on a determination of the first signal strength being less than the signal strength threshold; and
   to determine to decrease the output power of the device based on a determination of the first signal strength being greater than the signal strength threshold.

19. The system of claim 16, wherein sending the one or more poll requests to the one or more cable modem devices comprises:
   to determine a first time slot;
   to send a first poll request to the one or more cable modem devices during the first time slot;
   to determine a second time slot, wherein a time interval between the first time slot and the second time slot is predetermined; and
   to send a second poll request to the one or more cable modem devices during the second time slot.

20. The system of claim 16, wherein the at least one processor is further configured to execute the computer-executable instructions to:
   receive a second poll response from a second cable modem device of the one or more cable modem devices;
   determine, based on the second poll response, a second signal strength associated with the second cable modem device;
   determine that the second signal strength satisfies the signal strength threshold; and determine, based on the determination that the second signal strength satisfies the signal strength threshold, to maintain the output power of the device for the second cable modem device.

* * * * *